US 7,849,184 B1

United States Patent
Kahn et al.

(10) Patent No.: US 7,849,184 B1
(45) Date of Patent: Dec. 7, 2010

(54) METHOD AND APPARATUS OF MONITORING THE STATUS OF A SENSOR, MONITOR, OR DEVICE (SMD)

(75) Inventors: Philippe Kahn, Aptos, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 1146 days.

(21) Appl. No.: 11/245,657

(22) Filed: Oct. 7, 2005

(51) Int. Cl.
G06F 15/173 (2006.01)
G06F 11/00 (2006.01)
(52) U.S. Cl. .................................. 709/224; 714/27
(58) Field of Classification Search ......... 709/217–219, 709/223–226; 714/27
See application file for complete search history.

(56) References Cited

U.S. PATENT DOCUMENTS

| | | | |
|---|---|---|---|
| 5,737,439 A | 4/1998 | Lapsley et al. | |
| 5,771,001 A * | 6/1998 | Cobb | 340/573.1 |
| 6,595,929 B2 | 7/2003 | Stivoric et al. | |
| 6,990,660 B2 * | 1/2006 | Moshir et al. | 717/171 |
| 7,120,830 B2 * | 10/2006 | Tonack | 714/27 |
| 7,379,999 B1 * | 5/2008 | Zhou et al. | 709/224 |
| 7,457,872 B2 * | 11/2008 | Aton et al. | 709/224 |
| 2002/0138017 A1 * | 9/2002 | Bui et al. | 600/537 |
| 2003/0101260 A1 | 5/2003 | Dacier et al. | |
| 2003/0139908 A1 * | 7/2003 | Wegerich et al. | 702/183 |
| 2003/0149526 A1 * | 8/2003 | Zhou et al. | 701/213 |
| 2003/0196141 A1 * | 10/2003 | Shaw | 714/27 |
| 2003/0208113 A1 | 11/2003 | Mault et al. | |
| 2003/0227487 A1 | 12/2003 | Hugh | |
| 2003/0236625 A1 | 12/2003 | Brown et al. | |
| 2004/0017300 A1 | 1/2004 | Kotzin et al. | |
| 2004/0024846 A1 | 2/2004 | Randall et al. | |
| 2004/0043760 A1 | 3/2004 | Rosenfeld et al. | |
| 2004/0044493 A1 | 3/2004 | Coulthard | |
| 2004/0078219 A1 | 4/2004 | Kaylor et al. | |
| 2004/0078220 A1 | 4/2004 | Jackson | |
| 2004/0122294 A1 | 6/2004 | Hatlestad et al. | |
| 2004/0122295 A1 | 6/2004 | Hatlestad et al. | |
| 2004/0122296 A1 | 6/2004 | Hatlestad et al. | |
| 2004/0122297 A1 | 6/2004 | Stahmann et al. | |
| 2004/0122333 A1 | 6/2004 | Nissila | |
| 2004/0122484 A1 | 6/2004 | Hatlestad et al. | |
| 2004/0122485 A1 | 6/2004 | Stahmann et al. | |
| 2004/0122486 A1 | 6/2004 | Stahmann et al. | |
| 2004/0122487 A1 | 6/2004 | Hatlestad et al. | |

(Continued)

FOREIGN PATENT DOCUMENTS

WO  WO 02/088926 A1  11/2002

OTHER PUBLICATIONS

PCT Notification Preliminary Report on Patentability, PCT/US2006/29570, mailing date: Feb. 7, 2008, 6 pages.

(Continued)

*Primary Examiner*—Joseph E. Avellino
*Assistant Examiner*—Catherine Thiaw
(74) *Attorney, Agent, or Firm*—Blakely, Sokoloff, Taylor & Zafman, LLP; Judith A. Szepesi (57) ABSTRACT

A method or apparatus for monitoring the status of an SMD is described.

33 Claims, 11 Drawing Sheets

U.S. PATENT DOCUMENTS

| | | |
|---|---|---|
| 2004/0146048 A1 | 7/2004 | Cotte |
| 2004/0148340 A1 | 7/2004 | Cotte |
| 2004/0148341 A1 | 7/2004 | Cotte |
| 2004/0148342 A1 | 7/2004 | Cotte |
| 2004/0148351 A1 | 7/2004 | Cotte |
| 2004/0148392 A1 | 7/2004 | Cotte |
| 2004/0215755 A1* | 10/2004 | O'Neill .................... 709/223 |
| 2004/0259494 A1* | 12/2004 | Mazar ........................ 455/1 |
| 2005/0038691 A1* | 2/2005 | Babu ........................... 705/9 |
| 2005/0079873 A1* | 4/2005 | Caspi et al. ............. 455/456.1 |
| 2005/0101841 A9 | 5/2005 | Kaylor et al. |
| 2005/0102167 A1 | 5/2005 | Kapoor |
| 2005/0107944 A1 | 5/2005 | Hovestadt et al. |
| 2005/0113650 A1 | 5/2005 | Pacione et al. |
| 2005/0114502 A1* | 5/2005 | Raden et al. ............... 709/224 |
| 2005/0131736 A1* | 6/2005 | Nelson et al. ................. 705/2 |
| 2005/0182824 A1 | 8/2005 | Cotte |
| 2005/0235058 A1* | 10/2005 | Rackus et al. .............. 709/224 |
| 2005/0262237 A1* | 11/2005 | Fulton et al. ............... 709/224 |
| 2006/0109113 A1 | 5/2006 | Reyes et al. |
| 2006/0154642 A1 | 7/2006 | Scannell |
| 2006/0161459 A9 | 7/2006 | Rosenfeld et al. |
| 2006/0206587 A1* | 9/2006 | Fabbrocino ................ 709/219 |
| 2007/0024441 A1 | 2/2007 | Kahn et al. |
| 2007/0050157 A1 | 3/2007 | Kahn et al. |
| 2007/0067725 A1* | 3/2007 | Cahill et al. ............... 715/733 |
| 2007/0073934 A1* | 3/2007 | Rogers ........................ 710/59 |
| 2007/0192483 A1 | 8/2007 | Rezvani et al. |
| 2009/0099668 A1 | 4/2009 | Lehman et al. |

OTHER PUBLICATIONS

PCT International Search Report and the Written Opinion of the International Searching Authority, PCT/US2006/29570, mailing date Jul. 17, 2007, 7 pages.

* cited by examiner

| Alert Type | Alert Condition | Alert Target | Delivery Method | Alert Content |
|---|---|---|---|---|
| Auditor | No data received between 11 a.m. and 2 p.m. | John Doe (user) | SMS to 650-555-1212 | "You forgot to record your glucose level at lunch!" |
| Auditor | No data received for 6 daytime hours | John Doe (user) & Jane Doe (mother) | Instant Message to JohnDoe@example.com, email to Jane_Doe@example.com | "Time to measure glucose level for John." |
| Auditor | No response to ping | John Doe (user), Jane Doe (mother), Bob Jones (doctor) | SMS to 650-555-1212, email to Jane_Doe@example.com, voicemail to 408-555-1234 | "Glucose monitor did not respond to ping." |
| Auditor | SMD Status Problem | John Doe (user), John Smith (HMO) | email to JohnDoe@example.com, email to jsmith@HMO.example.com | "Battery appears to be failing, replace within next week." |
| Auditor | Problem Detected | Bob Jones (doctor), Jill Smith (repair tech) | voicemail to 408-555-1234, multimedia message to 800-555-FIXIT | "Problem X detected with system." |

METHOD AND APPARATUS OF MONITORING THE STATUS OF A SENSOR, MONITOR, OR DEVICE (SMD)

FIELD OF THE INVENTION

The present invention relates to SMDs, and in particular to monitoring the status of SMDs.

BACKGROUND

People increasingly rely on sensors, monitors and devices (SMDs) to perform critical actions and provide them with critical information at home and at the workplace. As the size and cost of these SMDs decreases and their functionality increases, these devices will work their way into all aspects of our daily lives. A given person will use SMDs made by many different manufacturers and will need a common method to monitor these SMDs and manage all of their functionality and data. These SMDs will require constant monitoring, and frequent updates and maintenance. Many SMDs will be performing mission critical tasks such that their performance must be guaranteed all the time.

Equally, product updates, notifications and recalls currently take a long time to reach the consumers who are using these products. For many applications, this delayed delivery of recall notices and the inadequate information provided results in unnecessary deaths and large economic loses. These deaths and loses could be avoided were users alerted immediately and provided with information as to the best course of action.

SUMMARY OF THE INVENTION

A method or apparatus for monitoring the status of an SMD is described.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is a method of verifying the status of various SMDs which are in periodic communication with a server. For certain SMDs, the periodic communication may be sufficiently irregular that status checks are needed. For certain other SMDs, if an expected communication is missed, an alert needs to be sent to ensure that the SMD is being used appropriately. For example, for an SMD that connects to the system irregularly, a status ping might be sent by the auditor, to ensure that the SMD continues to function. For another example, for an SMD that reports hourly, if an hourly check-in is missed, an alert may be issued to a user, healthcare provider or other recipient.

Figure 1:
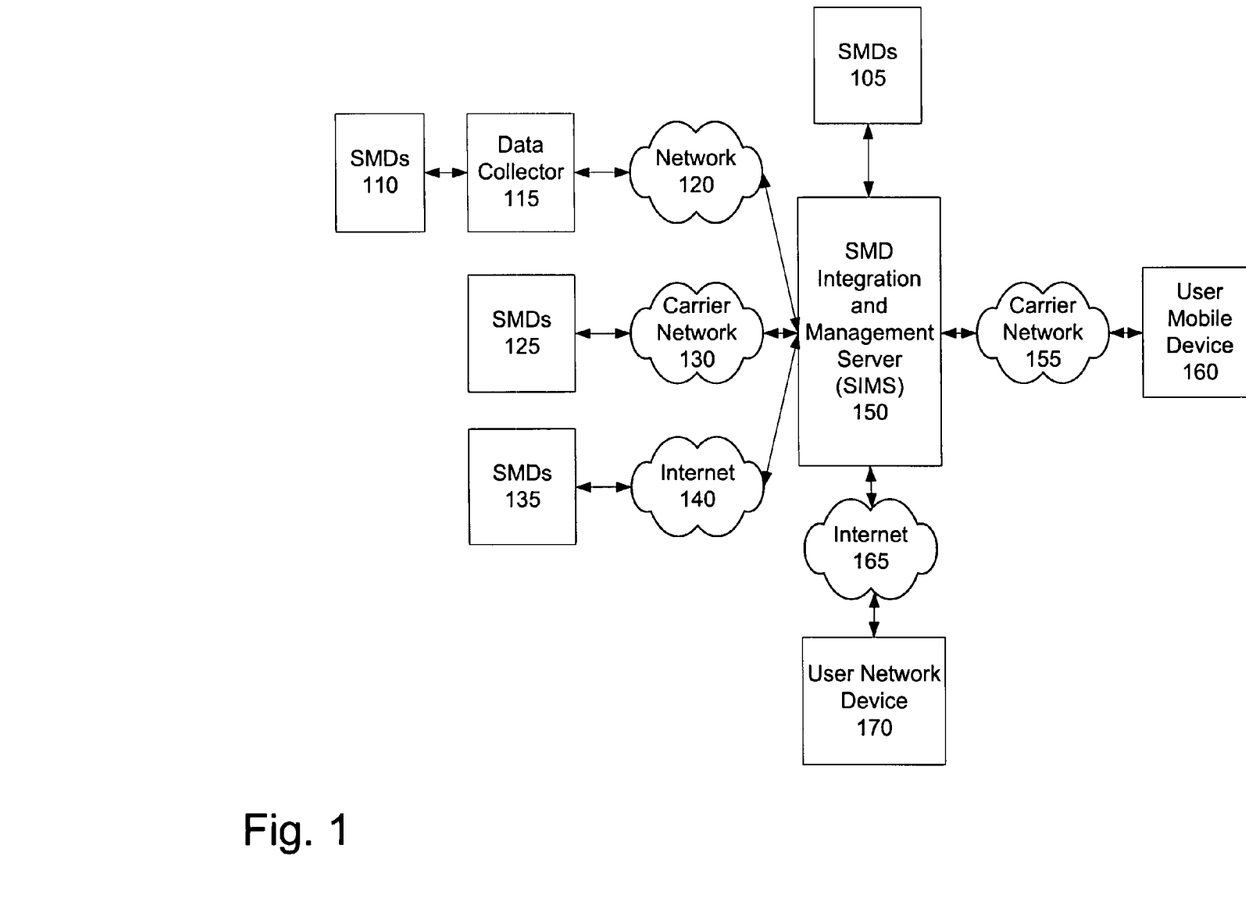
FIG. 1 is a block diagram of one embodiment of the system, including a central SMD integration and management server.

FIG. 1 is a network diagram of one embodiment of the various elements of the system. One or more of the various SMDs 105, 110, 125, 135 are coupled through various means to the SMD Integration and Management Server (SIMS) 150. They may be coupled directly, as shown for SMD 105, coupled through carrier network 130 as shown for SMD 125, coupled through the Internet 140 as shown for SMD 135, or coupled through another means. In one embodiment, SMDs 110 may be coupled through data collector 115, which accumulate data from one or more SMDs 110, and sends it through network 120 to SIMS 150.

SIMS 150 contains the MACS device (not shown). The MACS device is then accessible via the Internet 165, carrier network 155, or some other means to various user devices 160, 170.

Figure 2:
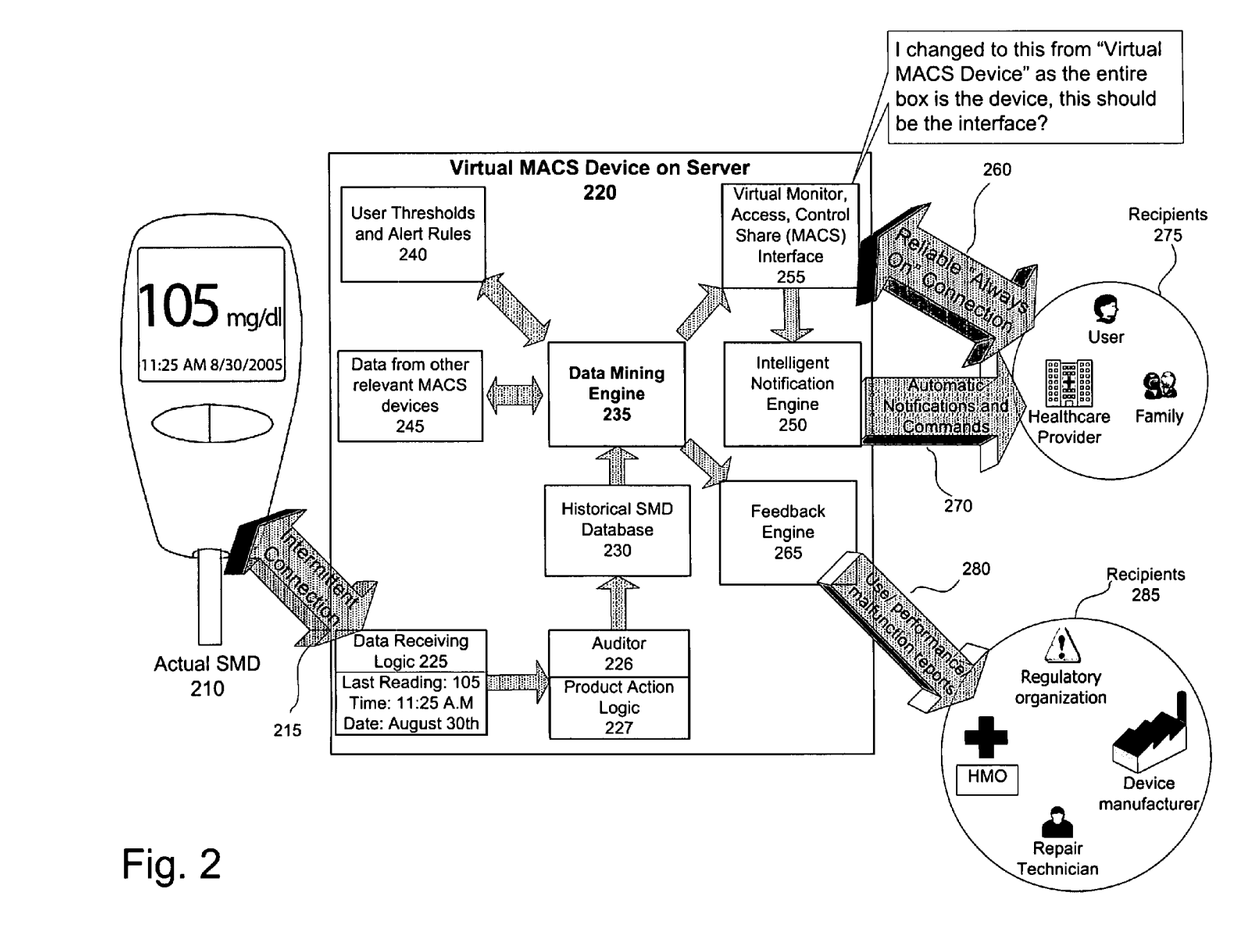
FIG. 2 is a more detailed block diagram of one embodiment of the Virtual Monitor/Alert/Control/Share Device on the server.

FIG. 2 is a block diagram illustrating one embodiment of the MACS device and its relationship to the actual SMD. The actual SMD 210 has an intermittent connection 215 to a server 220, or a virtual MACS device, which may reside on server 220. The connection 215 may be through the Internet, through a carrier network, or through other means. The server 220 may be located in the same location as the real SMD 210.

The data receiving logic 225 receives the data from the actual SMD 210 via an intermittent connection 215. The data is stored in historical database 230. The historical data is used by data mining engine 235, to present virtual MACS device interface 255 via a reliable always-on connection 260 to various recipients 275, 285. In a healthcare setting for example, the recipients may include the user, healthcare providers, and family. For environmental monitors, the recipients may include the responsible local and state officials, local residents, or other relevant recipients.

In one embodiment, data mining engine 235 may further interface with user alerts and rules 240 to generate notifications through intelligent notification engine 250. Intelligent notification engine 250 can send automatic notifications to designated recipients 275, when certain threshold or alert conditions are met. The threshold or alert conditions may include historical data, trend analysis, variance from charted trends, simple threshold, or any combination of the use of historical and current data from the actual SMD 210. In one embodiment, the data mining engine 235 constantly monitors the database 230, to ensure that the alert rules and user thresholds 240 have not been triggered. Intelligent notification engine 250 can, in one embodiment, trigger a notification in an appropriate format to any designated recipient.

In one embodiment, in addition to the database 230, data from other relevant actual SMDs may be received as well via logic 245. For example, in an environmental situation, in addition to the wind speed, the barometric pressure, or other relevant conditions may be monitored. The threshold and alert rules 240 may utilize a combination of data from more than one real SMD to trigger a notification or command 270.

In one embodiment, when the system includes a virtual monitoring, alerting, controlling, and sharing (MACS) device 220, an auditor 226 is created for the MACS device. The auditor 226 is designed to monitor the status of the MACS device, and ensure that the actual SMD 210 continues to function. The auditor 226, in one embodiment, monitors the data received by the MACS device. Auditor 226 ensures that when no data is received, the appropriate alerts are sent out. Product action logic 227 may be used to download updates for the actual SMD 210, and provide reports regarding the functioning of the SMD 210.

In one embodiment, feedback engine 265 can be used to provide reports 280 to various recipients 285. These recipients may include regulatory organizations, the device manufacturer, appropriate repair technicians, or a providing organization such as a doctor or HMO. Since generally the virtual MACS Devices 220 are coupled to many actual SMDs 210, the system may be able to generate useful performance data, as will be described below.

Figure 3A:
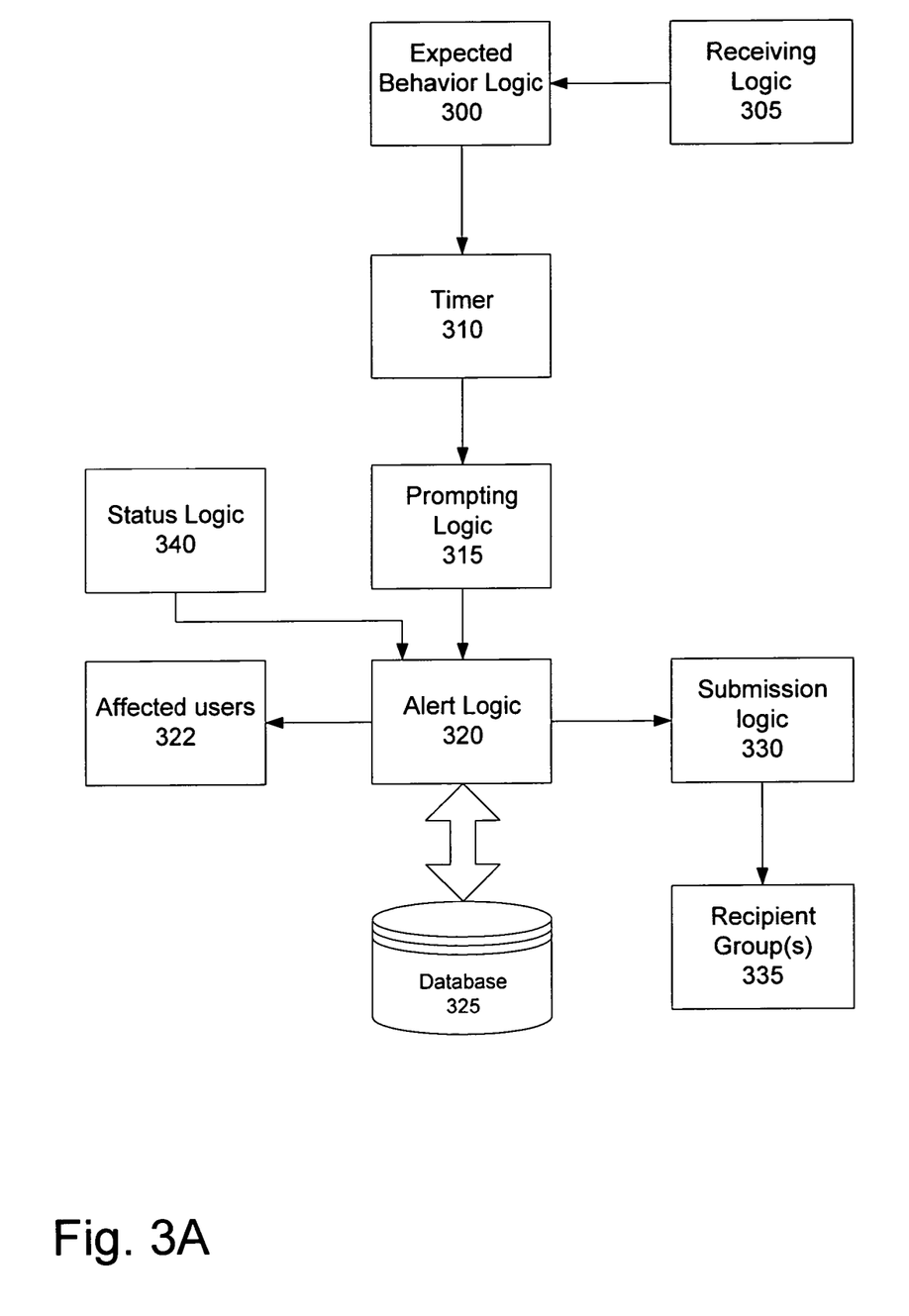
FIG. 3A is a block diagram of one embodiment of the Status Verification aspect of the MACS Auditor.

FIG. 3A is a block diagram of one embodiment of the Status Verification aspect of the MACS Auditor. The auditor is coupled to the MACS device 210. In one embodiment, the auditor 226 includes an expected behavior logic 300, which includes preprogrammed settings. These preprogrammed settings include the expected frequency/timing of readings from the actual SMD.

For example, for a glucose monitor, the expected behavior logic 300 may be programmed to check for readings four times a day. In one embodiment, the expected behavior logic 300 may be programmed to check for readings at particular times, for example at 9 a.m., 12 noon, 1 p.m., and 7 p.m., associated with mealtimes. For an alternate example, a water monitor may only send readings when there is a significant change in the water flow. Thus, the expected behavior logic 300 may be programmed to expect no readings, or one reading a week. In one embodiment, the alerts programmed into the system (described in more detail below) are used with expected behavior logic 300.

In one embodiment, a timer 310 is coupled to the expected behavior logic 300. The timer 310 enables the expected behavior logic to have a range of times for receiving the data from the actual SMD. For example, the expected behavior logic 300 may set the timer 310 when a reading is expected. If a reading is not received within the set time, through receiving logic 305, the expected behavior logic 300 sends a notification to ping logic 315.

In one embodiment, the timer 310 further monitors an overall time. For example, for the water flow monitor, the timer 310 is set when data is received from the actual SMD by receiving logic 305. The timer 310 triggers a notice to the expected behavior logic 300 if no new data is received within the preset period of time. For an exemplary water flow monitor, for example, if no new data is received in a full week, the notification is triggered.

Expected behavior logic 300, in one embodiment, uses prompting logic 315 to send a request for data to the actual SMD. The prompting logic 315 sends a notification to the actual SMD, requesting a response. The response by the actual SMD may be as simple as "yes, I'm still functioning" or may be as complex as a full report of monitor results and monitor status (battery level, connection strength, malfunction reports) over the past week. If no response is received to the notification sent by prompting logic 315, in one embodiment prompting logic sends the information to alert logic 320. In another embodiment, if the actual SMDs are unable to receive data, the prompting logic may be eliminated.

Alert logic 320 has various types of alerts, which it sends to various pre-programmed recipients 322. In one embodiment, when the auditor 210 is first set up, these alerts are defined. For example, for the glucose monitor described above, the alert logic 320 may be set up to alert the patient and the monitoring medical personnel that a glucose test was not taken at the appropriate time. For a failure to respond to the notification from the prompting logic 315, on the other hand, may in one embodiment send a different alert. For example, the alert may be sent to a technician to verify that the actual SMD is still functional.

In one embodiment, alert logic 320, as well as expected behavior logic 300 log the status of the SMD in database 325. In one embodiment, alert logic 320 may send data to submission logic 330 when certain criteria are met. Submission logic 330 is used to create reports regarding particular SMDs. For example, a hospital or HMO which distributes SMDs to their patients may request a periodic report, regarding the functioning of the SMDs. These reports, in one embodiment, may include statistical information about the SMD use, as well as any SMD failures. In one embodiment, the submission logic 330 generates statistical data that does not include patient identifying information. In one embodiment, submission logic 330 may further create reports for the SMD manufacturer, and/or for regulatory agencies. Since the SIMS system collects data about many SMDs, this may provide valuable feedback. In one embodiment, the submission logic 330 generates submissions to manufacturers and/or regulatory agencies only when a particular type of malfunction has been detected. In one embodiment, if an alert is sent to a technician, the technician's report is added to the database 325.

In one embodiment, the system may further include a status logic 340. Status logic 340 tracks the various available status indicators of the SMD. The status may include one or more of the following: firmware versions, battery levels, battery quality, connection strength, malfunction reports, and software updates. In one embodiment, Status logic 340 may determine that an alert is necessary, and send a notification to alert logic 320. In one embodiment, status logic 340 may also analyze trend lines for certain status indicators such as battery level, battery quality (i.e. how much charge the battery takes when newly charged), and connection strength. If the trend-line for these statuses indicates a future problem—i.e. that the battery will fail within a preset period, or that the battery will not take sufficient power—status logic 340 may trigger alert logic 320 to send an alert.

Figure 3B:
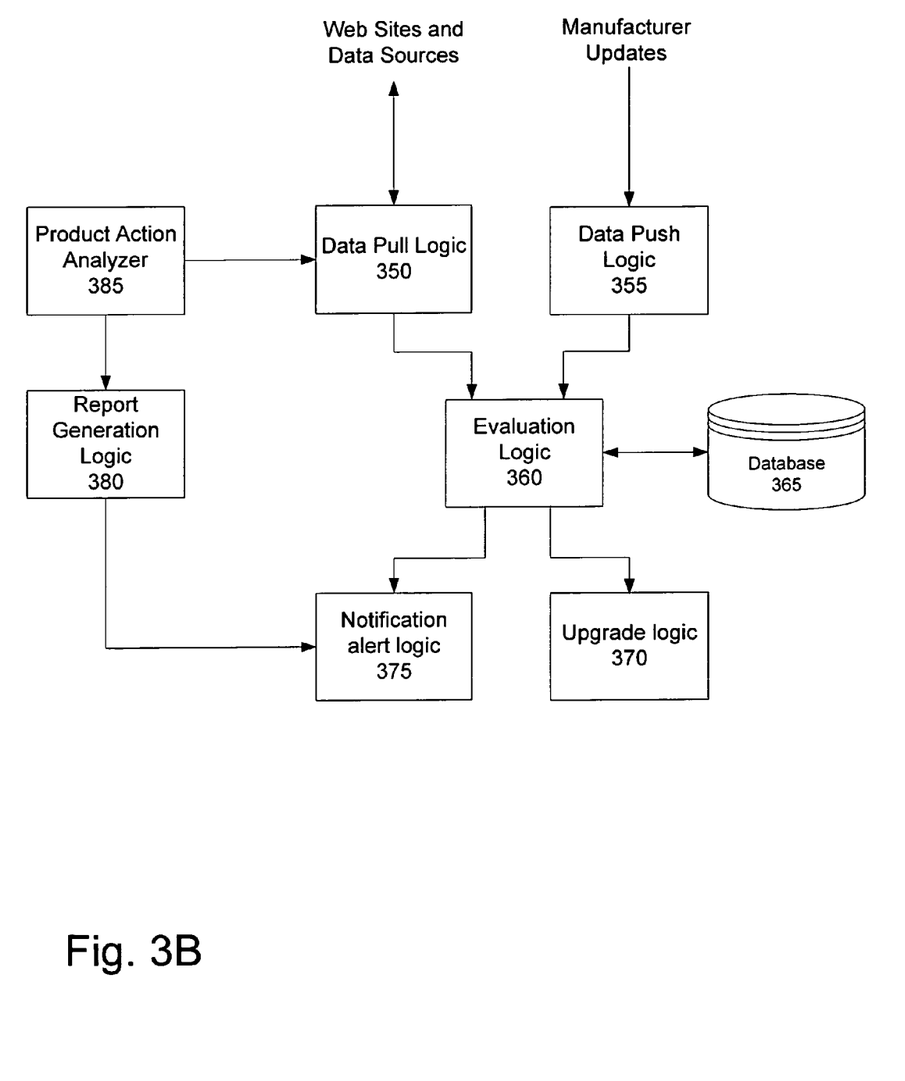
FIG. 3B is a block diagram of one embodiment of the Update/Notification aspect of the MACS Auditor.

FIG. 3B is a block diagram of one embodiment of the Update/Notification aspect of the MACS Auditor. Data pull logic 350 and data push logic 355 obtain updates, notices, and other relevant information from various sources. In one embodiment, data push logic 355 receives updates from manufacturers, or any other agency that is willing to send out SMD-related updates or notifications. In one embodiment, the system may subscribe to any available update service. In one embodiment, a subscription is generated for each type of SMD which is supported by the SIMS system.

Data pull logic 350, in one embodiment, goes to various resources that do not push data, and obtains data. For example, currently for computer systems many manufacturers maintain a site that includes firmware upgrades. Upgrades of this type would be obtained by data pull logic 350. On the other hand, for example, Windows™ includes an upgrade feature which pushes upgrades to the Windows operating system to the user. Data of that sort would be obtained by the data push logic 355. In one embodiment, data pull logic 350 is triggered periodically, such as once a week. Alternatively, data pull logic may be triggered by information received from data push logic 355, or from product action 385. Furthermore reports and upgrade data may be made available as RSS feeds. Data pull logic 350 may be triggered to periodically collect relevant RSS feeds.

Evaluation logic 360 uses the data obtained by data pull logic 350 and data push logic 355, to determine whether any actions need to be taken. In one embodiment, the database 365 stores the obtained data, and evaluation logic 360 periodically surveys currently supported SMDs to determine whether any actions should be taken.

If the obtained data is something that the user, or a doctor or related individual/group/agency should be aware of, notification alert logic 375 sends out a notification with the information. In one embodiment, the notification comprises an email, an instant message (IM), a notification on the SMD if it is so enabled, a short message system (SMS), a multimedia message (MMS), or another form of electronic contact. In one embodiment, the notification alert logic 375 may trigger the mailing of a physical letter.

If the obtained data is a firmware upgrade, evaluation logic 360 triggers upgrade logic 370. Upgrade logic 370 pushes the upgrade to the affected SMD(s). If the SMD cannot be remotely upgraded, upgrade logic 370 uses notification/alert logic 375 to inform the user, and other relevant parties, that the SMD should be taken to an appropriate location for repairs.

In one embodiment, in addition to activities being triggered by data obtained through data pull logic 350 and data push logic 355, a product action 385 may be received from an SMD. A product action notice, received by the SIMS system and handled by the product action analyzer 385, is a notification from a device that something is not functioning properly. In one embodiment, the SIMS system may determine that the SMD is not functioning properly based on the results being obtained from the SMD. The product action, received by product action analyzer 385 may trigger a data pull.

In one embodiment, product action analyzer 385, may also pass the data from the SMD to the report generation logic 380. Report generation logic 380 may generate a report, if sufficient numbers of SMDs have reported the same, or similar, errors. In one embodiment, these reports may be sent to the device manufacturer, the device distributor, and/or effected users. In one embodiment, the report generation logic 380 uses notification alert logic 375 to send relevant reports to users and/or device distributors such as doctors that are within the alerts chain.

Figure 4:
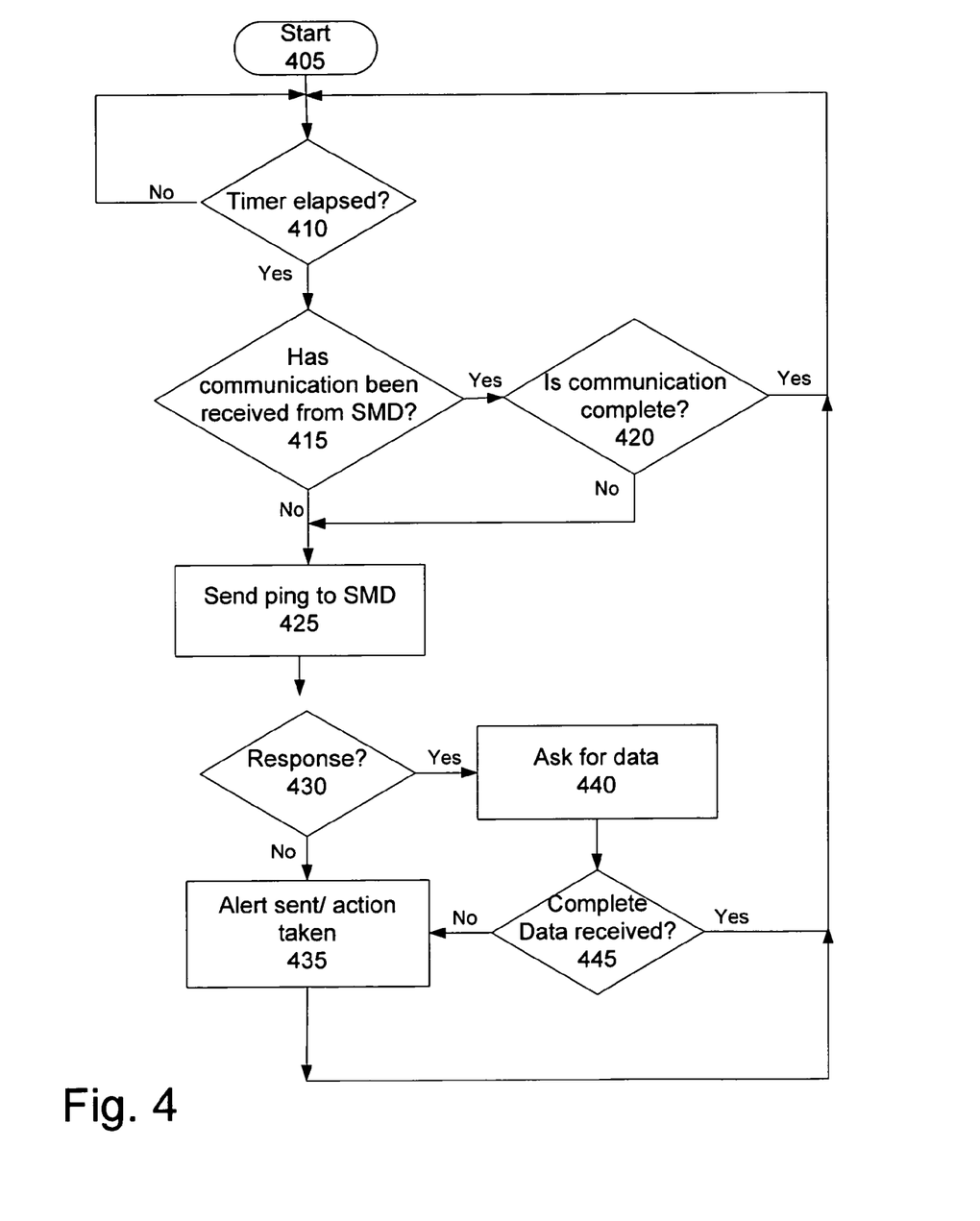
FIG. 4 is a flowchart of one embodiment of the function of the MACS Auditor for verifying SMD status.

FIG. 4 is a flowchart of one embodiment of the function of the MACS Auditor for verifying SMD status. The process starts at block 405. In one embodiment, a separate such process is continuously running for each SMD in the system. In one embodiment, while these processes are shown as flowcharts, they may be implemented as separate functionalities triggered by interrupts, as is known in the art.

At block 410, the process determines whether the timer has elapsed. The timer indicates when communication is expected from an SMD. If the timer has not elapsed, the process continues to wait. If the timer has elapsed, the process continues to block 415.

At block 415, the process determines whether a communication has been received from the SMD. If so, the process determines whether the communication is complete, at block 420. A complete communication includes all of the expected data for that particular communication. A complete communication can range from a simple "no change" sign-in to significant amounts of data. If the communication is complete, the process resets the timer, and returns to block 410. If the communication is not complete, the process continues to block 425.

If no communication was received from the SMD, at block 415, the process continues to block 425.

At block 425, a ping is sent to the SMD. The ping, in one embodiment, sends a packet to the specified address and waits for a reply. In one embodiment, the ping triggers an immediate response from a functional SMD capable of responding to such a ping. In one embodiment, if the SMD is not capable of receiving and processing pings, this process may proceed directly to block 435.

At block 430, the process determines whether there was a response to the ping. If there was a response, the process continues to block 440. In one embodiment, the ping response is simply a "packet received" response. In another embodiment, the ping response is an actual data packet. If the ping response is simply a "packet received," at block 440 data is requested. At block 445, the process determines whether a complete data set has been received. The complete data set includes all of the expected data for this time. In one embodiment, the data set requested may include historical data as well as current data, if the SMD is capable of storing historical data. If the complete data set is received, the process resets the timer, and returns to block 410.

If no response is received to the ping, at block 430, or the data received is not complete, the process continues to block 435. At block 435, an alert is sent or an action is taken, depending on the preferences set. The alert may be via an alternative path to the user, indicating that the system is not functioning.

Figure 5:
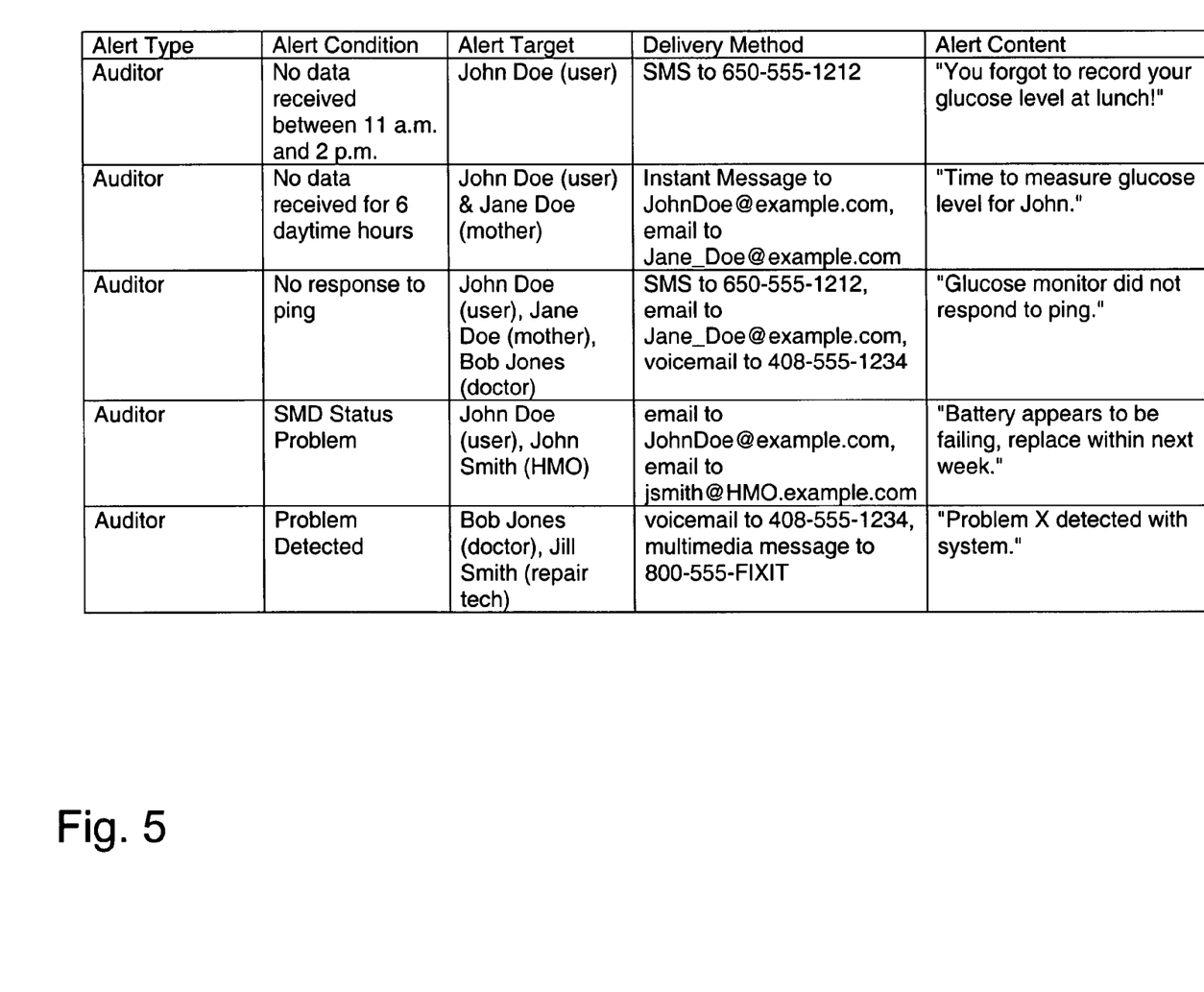
FIG. 5 illustrates one embodiment of setting alerts for the auditor system.

FIG. 5 illustrates one embodiment of setting auditor alerts. As can be seen, auditor alerts indicate a triggering condition, a format, a destination, and a content of the alert. In one embodiment, the auditor alerts may be associated with status, failure to receive data, failure to respond to a ping, failure to collect data properly, a trend-line indicating future failure based on status information, or other relevant information available about the actual SMD via the MACS device.

Figure 6A:
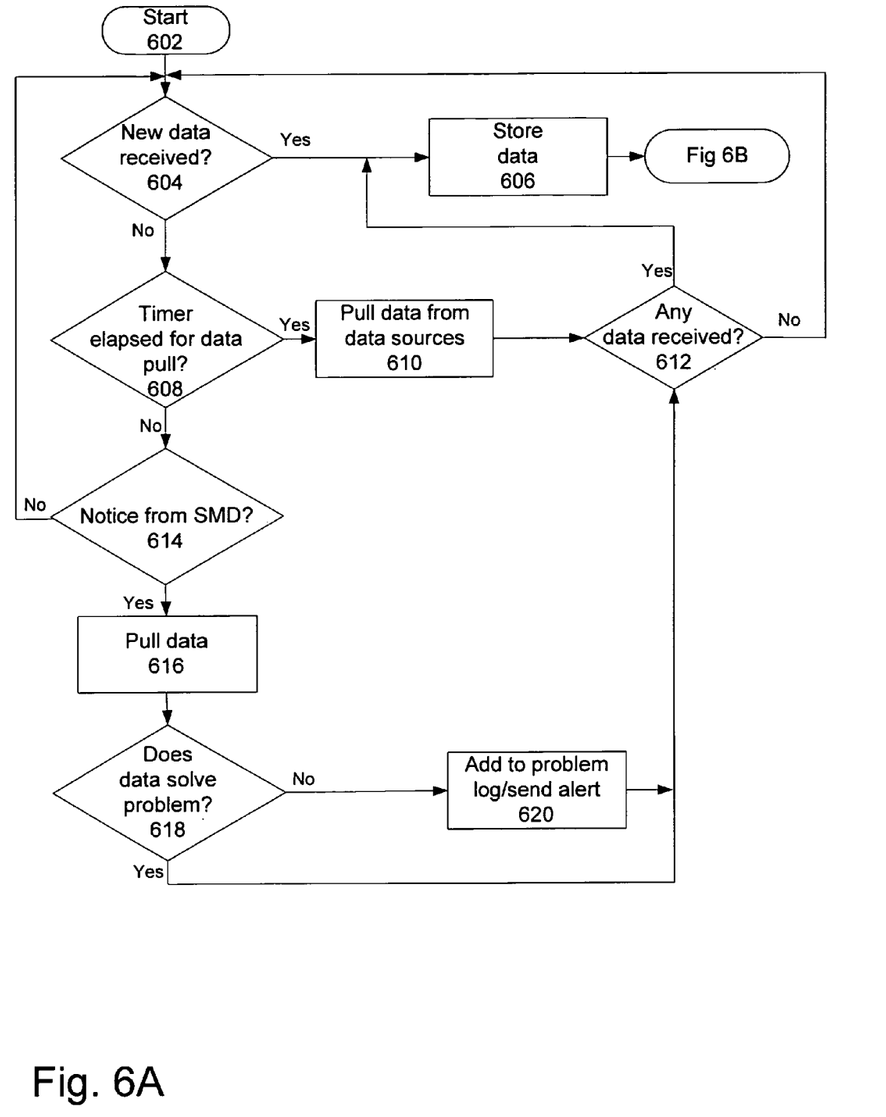
FIGS. 6A and 6B are a flowchart of one embodiment of using the MACS Auditor.
Figure 6B:
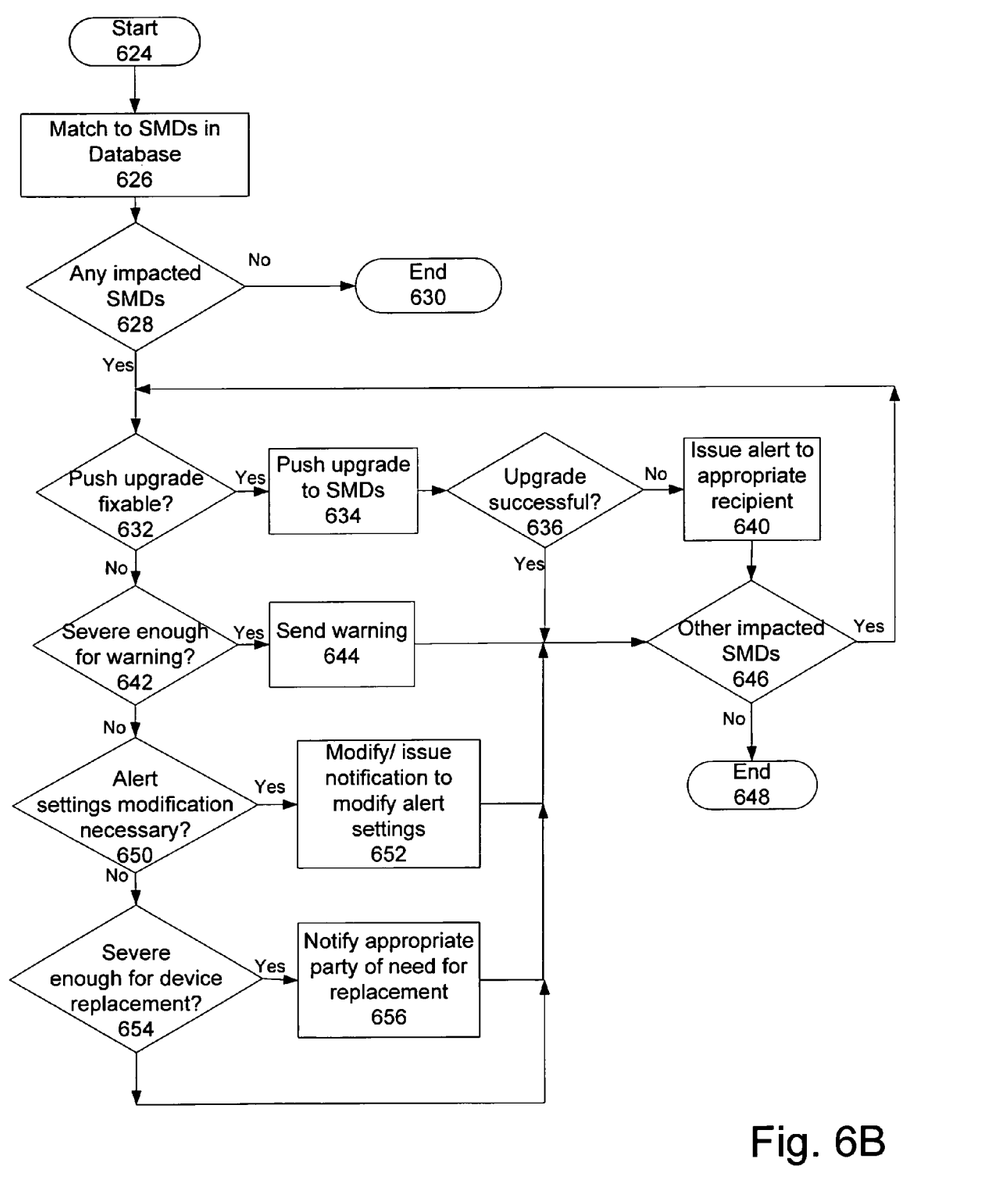

FIGS. 6A and 6B are flowcharts of one embodiment of using the MACS Auditor. The process starts at block 602. At block 604, the process determines whether new data has been received. New data is a notification pushed by a source, such as a manufacturer or regulatory agency. If a notification has been received, the process continues to block 606. At block 606, the process stores the notification information. The process then continues to block 624, shown in FIG. 6B.

If no notification is received, the process, at block 608, determines whether a timer has expired. If the timer has expired, the process goes to the data sources to fetch data, at block 610. These data sources may include one or more of the following: regulatory agencies, manufacturers, hospital reports of SMD functionality, news reports of SMD failures, and other relevant data sources. The data may include information regarding failures, information regarding upgrade availability, actual firmware upgrade data, and other information. At block 612, the process determines whether any data was received in the data pull. If no data was received, the process resets the timer, and returns to block 604. If data has been received, the process continues to block 606 to store the data, and then on to block 624, in FIG. 6B.

If the timer has not elapsed, at block 708, the process continues to block 614. At block 614, the process determines whether a problem alert notice has been received from an SMD. If no problem alert has been received, the process returns to block 604.

If a notice has been received, the process continues to block 616. At block 616, data is pulled. A data pull, in one embodiment, comprises visiting the various websites and resources that make data available, and obtaining data related to the SMD(s) which reported the problem.

At block 618, the process determines whether the pulled data solves the problem alerted by the SMD. If so, the process continues to block 606 where the data is stored, and then on to 624, shown in FIG. 6B.

If the problem is not solved by the pulled data, the process adds the data to a problem/error log, at block 620. The process then continues to block 612, to determine whether any data was received. If so, the process continues to block 608, where the data is stored, and then on to 624, in FIG. 6B.

At block 624, the data is matched to the SMDs in the database. The SIMS system includes a database of each SMD that is supported by the SIMS system, as well as each actual SMD connected to the SIMS system, including relevant information. Thus, for example, the system may include the following information: Glucose monitor, Manufacturer: X, Firmware version: Y, Number of actual SMDs: Z. In one embodiment, these SMDs are laid out in a hierarchical fashion, such that each glucose monitor is a branch, each glucose monitor from manufacturer X is a sub-branch, etc.

At block 628, the process determines whether there are any impacted SMDs. That is, the data received is matched to the actual SMDs to figure out whether any actual SMDs coupled to the SIMS system are impacted.

If there are no impacted SMDs, the process ends at block 630. In one embodiment, the process stores the received information, so that subsequently added SMDs can receive appropriate warnings. Under this embodiment, when a new SMD is added to the system, the system checks the database to see if the SMD has any alerts, product upgrades, defects, recalls, or other notifications associated with it. This ensures that no defective SMDs can be added to the system without an express warning.

If there are impacted SMDs, the process continues to block 632. At block 632, the process determines whether the problem is fixable through a push upgrade. A push upgrade is the ability to upgrade a device's firmware while the device is in use, remotely. For example, Windows™ and Tivo™ have this feature available. If the firmware upgrade can be pushed, the process continues to block 634.

At block 634, the upgrade is pushed to the SMDs. In one embodiment this is done simultaneously for each SMD. In another embodiment this may be done sequentially. At block 636, the process determines whether the upgrade(s) were successful. If the upgrade was not successful, an alert is issued to the appropriate recipients, at block 640. The process then continues to block 646, to determine whether there are any other impacted SMDs. If so, the process continues to block 632 to determine whether the problems are fixable by an upgrade. If there are no other impacted SMDs, the process continues to block 648, and ends.

If, at block 632 the system determines that the problem is not upgrade fixable, the process continues to block 642. At block 642, the process determines whether the problem is severe enough for a warning. Problems that impact actual use or reliability of the device would, in general, be considered severe enough for a warning. For example, an error may be that the SMD is unable to provide quality readings below a certain level. For example, if the user's blood pressure is below 90/50, on a regular basis, the SMD may be unable to take correct readings. In that instance, a warning is sent to the user, indicating that if this is the case, the user should upgrade the device or otherwise perform some fix. In one embodiment, the system actually performs a per-user evaluation of whether the problem is applicable. Since the system has historical data, it can be used to evaluate whether any issues with the SMD are likely to be triggered by the user. In one embodiment, the wording of the warning may be altered based on the historical data associated with the user. In other words, in one embodiment, the warning, sent at block 644, may be customized.

If a warning was sent, the process then continues to block 646 to determine whether there are any other impacted SMDs.

If the problem was not severe enough to warrant a warning, the process, at block 650 determines whether the problem is severe enough to cause an alteration in the alert settings. For example, if the device consistently has a slow clock, the alert mechanism for failed readings may be adjusted to account for this delay. The alerts and modifications are changed at block 652. The process then continues to block 646 to determine whether there are any other impacted SMDs.

At block 654, the process determines whether the problem is severe enough to trigger device replacement/repair. If so, the appropriate parties are notified, at block 656. In one embodiment, these parties may include: the user, the issuing hospital or doctor, an appropriate technician, and the manufacturer. The process then returns to block 646, to determine whether there are any other impacted SMDs.

Figure 7:
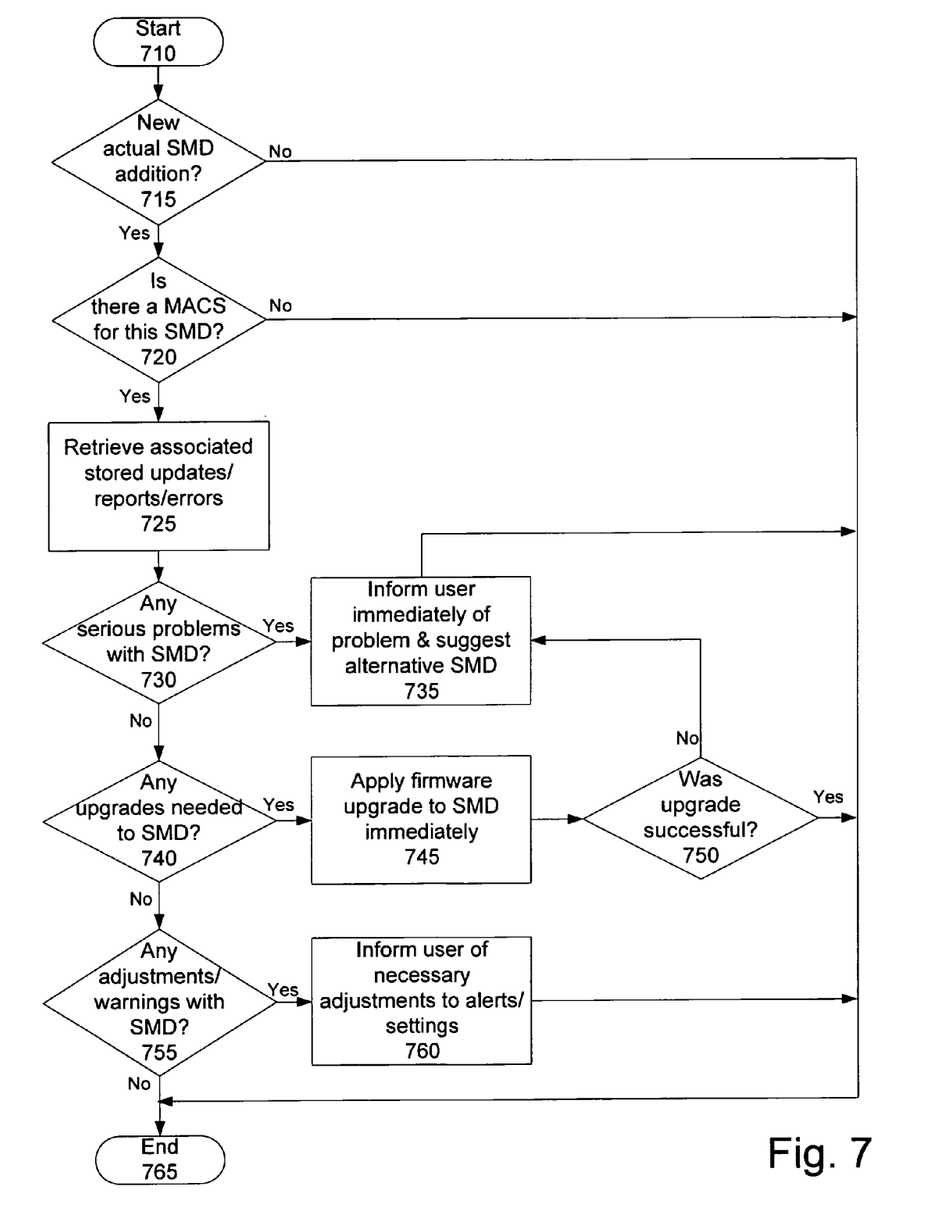
FIG. 7 is a flowchart of one embodiment of using the auditor when new SMDs are added into the system.

FIG. 7 is a flowchart of one embodiment of using the auditor when new SMDs are added into the system. The process starts at block 710. In one embodiment, the process is available whenever a doctor, administrator, or other qualified person attempts to add a new SMD. In another embodiment, the process is available whenever a user attempts to add a new SMD to the SIMS system.

At block 720, the process determines whether there is a MACS device for this SMD. There is a MACS (monitor, alert, control, share) device, providing a virtual SMD, for each SMD supported by the system. In another embodiment, each actual SMD currently coupled to the system has a corresponding MACS device.

If there is no MACS device, then the system does not have stored upgrades, problems, and the process ends. In one embodiment, an alert is issued to the relevant recipients that the device is not supported by the SIMS system.

If there is a MACS device, the process continues to block 725. At block 725, the process retrieves updates/reports/errors or other relevant data regarding the SMD about to be added. As noted above with respect to FIG. 6A, whenever data is downloaded—upgrades, warnings, errors, etc.—they are saved. Thus, the system is able to retrieve such information, when the new SMD is added to the system.

At block 730, the process determines whether any serious problems have been identified with the SMD. Serious problems are those that would generally lead to a necessary recall or repair of a device, or that would make the device unreliable. If there is an identified serious problem, at block 735, the process informs the user that the suggested SMD should not be provided. In one embodiment, the process provides alternative SMD suggestions. In one embodiment, the SMD suggestions include SMDs from the same manufacturer which do not have the identified flaw. In another embodiment, SMDs may be suggested based on an alternative criterion. These criteria, in one embodiment, may include: SMD reliability ratings, known preferences of the user, relationship with manufacturer(s), or other reasons. The process then ends at block 765.

If, at block 730, no serious problems are found, the process continues to block 740. At block 740, the process determines whether any problems have been identified which necessitate an upgrade. In one embodiment, any upgrades that cannot be performed remotely are classified as "serious problems" since they need physical access to the device. However, for upgrades that can be remotely applied, this classification is used. If there is an upgrade-solvable problem, the process continues to block 745. At block 745, the firmware upgrade is applied to the device. In one embodiment, the user is informed, that there may be a problem with the device, and that the system should not be released to the patient/end-destination yet.

At block 750, the process determines whether the upgrade was successfully applied. If so, the user is informed that the SMD is now fully functional, and the process ends at block 765. If the upgrade was not successfully applied, the process continues to block 735, and the user is informed that this SMD cannot be released to its destination.

If, at block 740, the process found no upgrades required, the process continues to block 755. At block 755, the process determines whether there are any adjustments or warnings that should be provided with this SMD. Certain SMDs, for example, may be known to measure slightly high values, or may be known to not function well at a certain range. In one embodiment, such SMD issues are disclosed to the user, at block 760, but the user is permitted to issue the SMD to its final destination. This enables the user to ensure that any alerts are appropriately set, and that the SMD is not issued into a situation that would trigger such problems.

In another embodiment, based on user preferences, any SMD with any problem may simply trigger a warning to the user. In another embodiment, the user is prohibited from adding any SMD with any problem to the system.

The process then ends, at block 765.

Figure 8:
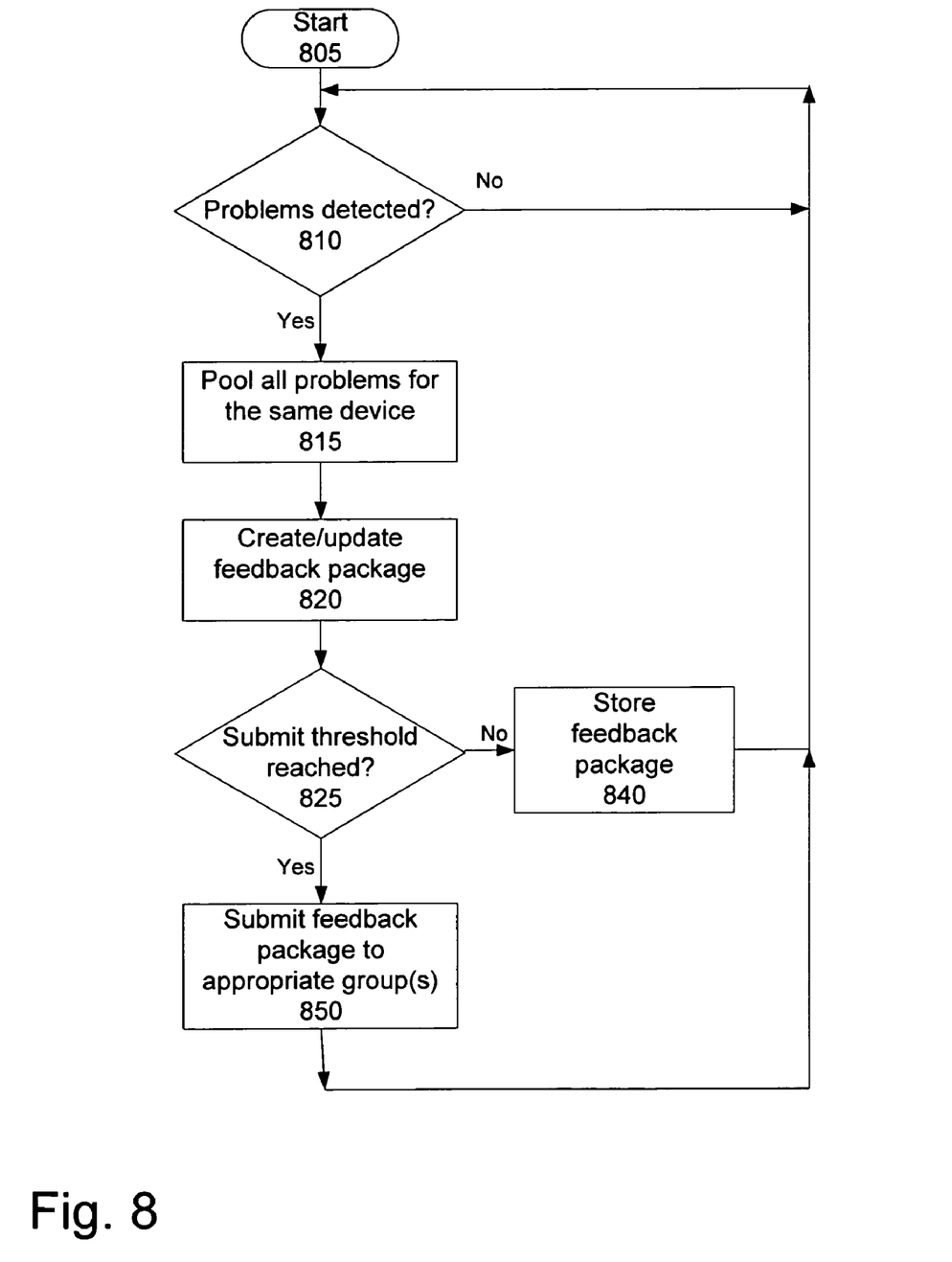
FIG. 8 is a flowchart of one embodiment of generating feedback.

FIG. 8 is a flowchart of one embodiment of generating feedback. In one embodiment, this process is run automatically once every week, or month. In another embodiment, this process is triggered whenever a sufficient number of problem alerts have been received. In another embodiment, this process is triggered when the problem is severe. The process, at block 810 determines whether problems have been detected. These problems include issues raised by users, as well as problem alerts from various SMDs. If there are no problems, the process returns to block 810. Otherwise, the process continues to block 815.

At block 815, all problems for a particular device are pooled.

At block 820, a feedback package is created or updated. In one embodiment, the feedback package includes all of the relevant data, in a format which can be processed by the receiving parties.

At block 825, the process determines whether the submit threshold has been reached. In one embodiment, for non-severe problems, the feedback is only submitted if a sufficient number of devices have exhibited the problem. This ensures that the manufacturer does not get submissions for trivial problems, or problems caused by user error. If the submit threshold has not been reached yet, the process continues to block 830.

At block 830, the feedback package is stored. In one embodiment, subsequent problems are added to the same feedback package, by simply updating the content. This enables a feedback package to be built over time, and means that the SIMS system does not need to reprocess the same data over and over.

If the submit threshold has been reached, the process, at block 840, submits the feedback package to the appropriate group(s). These groups may include the issuing agency (Veteran's Affairs, Medicare, etc.), the issuing hospital or doctor, the manufacturer, and relevant regulatory agencies. In one embodiment, the feedback package may be reformatted for each recipient, to provide feedback in a format that is most appropriate for each recipient.

Figure 9:
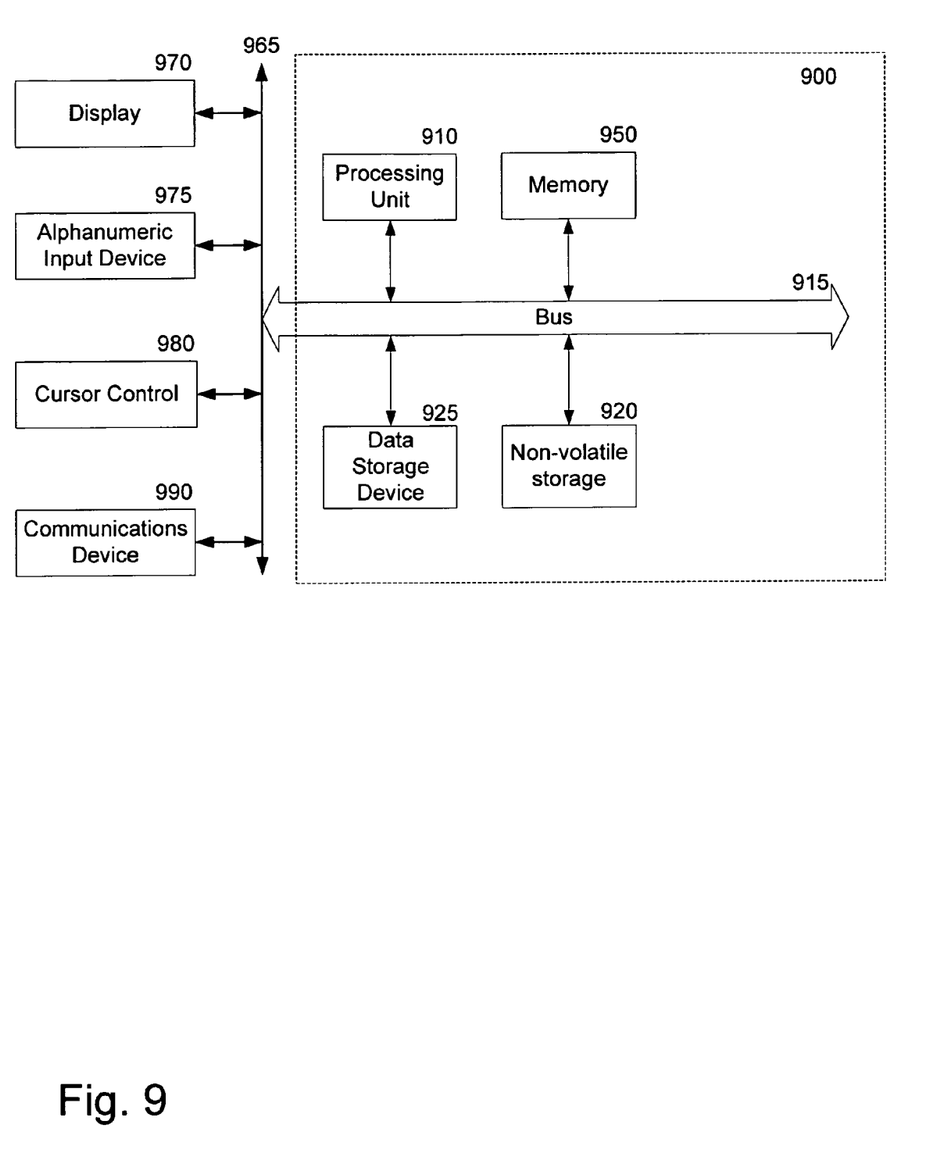
FIG. 9 is a block diagram of one embodiment of a computer system which may be used with the present invention.

FIG. 9 is one embodiment of a computer system that may be used with the present invention. It will be apparent to those of ordinary skill in the art, however that other alternative systems of various system architectures may also be used.

The data processing system illustrated in FIG. 9 includes a bus or other internal communication means 915 for communicating information, and a processor 910 coupled to the bus 915 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic disk or optical disk and its corresponding disk drive. Data storage device 925 is coupled to bus 915 for storing information and instructions.

The system may further be coupled to a display device 970, such as a cathode ray tube (CRT) or a liquid crystal display (LCD) coupled to bus 915 through bus 965 for displaying information to a computer user. An alphanumeric input device 975, including alphanumeric and other keys, may also be coupled to bus 915 through bus 965 for communicating information and command selections to processor 910. An additional user input device is cursor control device 980, such as a mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, a wireless connection mechanism, or any other mechanism that provides connectivity between the computer system 900 and the outside world. Note that any or all of the components of this system illustrated in FIG. 9 and associated hardware may be used in various embodiments of the present invention.

It will be appreciated by those of ordinary skill in the art that any configuration of the system may be used for various purposes according to the particular implementation. The control logic or software implementing the present invention can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The present invention may also be embodied in a handheld or portable device containing a subset of the computer hardware components described above. For example, the handheld device may be configured to contain only the bus 915, the processor 910, and memory 950 and/or 925. The present invention may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 910. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus to implement an auditor to work with a virtual monitoring, alerting, controlling, and sharing (MACS) device, which is designed to receive data from an actual sensor, monitor, or device (SMD), the apparatus comprising:
    a processor to execute an expected behavior logic, the expected behavior logic to:
        monitor for receipt of data by the virtual MACS device from the actual SMD, the data regarding functionality of the SMD;
        monitor for receipt of additional data by the MACS device from an additional SMD that is of the same type and model as the SMD, the additional data regarding functionality of the additional SMD;
        compare the data and the additional data with a stored range of accepted behaviors of the SMD and the additional SMD, wherein the range of accepted behaviors represent behaviors of non-malfunctioning SMDs;
        make a determination that the SMD and the additional SMD are behaving outside the range of the accepted behaviors based on the data received from the SMD and the additional SMD; and
        detect a problem that is shared by the SMD and the additional SMD based on the determination;
    the processor to execute an additional logic to determine whether the problem can be corrected by an update of the SMD and of the additional SMD;
    the processor to obtain the update from an update server via a web syndication feed; and
    the processor to execute an update logic to deploy the update to the SMD and to the additional SMD if the problem can be corrected by the update and to determine whether the updates were successfully installed on the SMD and on the additional SMD.

2. The auditor of claim 1, wherein the MACS device is expected to receive the data within a predetermined time-frame, further comprising:
    the alert logic to send an alert when the data is not received within the predetermined time-frame.

3. The apparatus of claim 1, wherein the MACS device is expected to receive the data within a predetermined time-frame, further comprising:
    the processor to execute a prompting logic to send a ping to the SMD and monitor for a response to the ping when the data is not received by the MACS device from the SMD within the predetermined time-frame.

4. The apparatus of claim 1, further comprising:
    the alert logic to send an alert if a response to the ping is not received within an allotted time period.

5. The apparatus of claim 4, wherein the alert is sent to one or more of the following: a user, a device provider, an insurer or other payer, and to maintenance personnel, indicating that the SMD should be tested to ensure its functioning.

6. The apparatus of claim 1, further comprising:
    an alert set-up logic to enable the setting up of one or more of the following: conditions for an alert, one or more designated contacts for the alert, one or more methods of sending the alert for each of the designated contacts, and the content of the alert.

7. The apparatus of claim 1, wherein the designated recipients include one or more of the following: a regulatory agency, a manufacturer, a payer, and an issuing individual or group.

8. The apparatus of claim 1, further comprising:
    the processor to execute a data logic to obtain warnings and updates regarding one or more SMDs;
    the processor to execute an evaluation logic to determine whether any the SMD or additional SMD supported by the auditor are impacted by the warnings or updates, and to trigger an appropriate action if the SMD or the additional SMD supported by the auditor are impacted.

9. The apparatus of claim 8, wherein the warnings are obtained using one or more of a data pull logic to obtain data from external sites, and a data push logic to receive data sent to the auditor.

10. The apparatus of claim 9, wherein the data pull logic is triggered by one or more of the following: a timer expiring, a notice from an SMD or the auditor that there is a problem with an SMD.

11. The apparatus of claim 8, further comprising:
    the processor to execute an upgrade logic to remotely upgrade the SMD with a received update.

12. The apparatus of claim 8, further comprising:
    the processor to execute a notification alert logic to send a notification to appropriate parties when a sufficiently severe warning is received.

13. The apparatus of claim 1, further comprising:
    the processor to execute a status logic to track a status of the SMD, the status including one or more of the following: firmware versions, battery levels, battery quality, connection strength, malfunction reports, and software updates.

14. The apparatus of claim 13, wherein the status logic sends a notice to a notification alert logic if a status is becoming outside of acceptable parameters.

15. The apparatus of claim 13, wherein the status logic sends a notice to a notification alert logic if a trend-line associated with a status or combination of statuses indicates a future problem.

16. A computerized method of providing auditing of a functionality of an actual sensor, monitor, or device (SMD), the method comprising:
- monitoring for receipt of data by a processor executing a virtual monitoring, alerting, controlling, and sharing (MACS) device from the SMD, the data regarding functionality of the SMD;
- monitoring for receipt of additional data by the processor from an additional SMD that is of the same type and model as the SMD, the additional data regarding functionality of the additional data;
- comparing the data and the additional data with a stored range of accepted behaviors of the SMD and the additional SMD, wherein the range of accepted behaviors represent behavior of non-malfunctioning SMDs;
- making a determination that the SMD additional data are behaving outside the range of accepted behaviors based on the data received from the SMD and the additional data received from the additional SMD;
- detecting a problem that is shared by the SMD and the additional SMD based on the determination;
- determining whether the problem can be corrected by an update of the SMD and of the additional SMD;
- obtaining the update from an update server via a web syndication feed; and
- if the problem can be corrected by the update, deploying the update to the SMD and to the additional SMD determining whether the update was successfully installed on the SMD and the additional SMD.

17. The computerized method of claim 16, wherein the MACS device is expected to receive the data within a predetermined time-frame, the method further comprising:
- sending an alert when the response is not received within the predetermined time-frame.

18. The computerized method of claim 16, wherein the MACS device is expected to receive the data within a predetermined time-frame, the method further comprising:
- sending a ping to the SMD when the data is not received by the MACS device from the SMD within the predetermined time-frame; and
- sending an alert if there is no response to the ping.

19. The computerized method of claim 17, wherein the alert is sent to one or more of the following: a user, a device provider, an insurer or other payer, and to maintenance personnel, indicating that the SMD should be tested to ensure its functioning.

20. The computerized method of claim 16, further comprising:
- enabling the setting up of one or more alert conditions.

21. The computerized method of claim 20, further comprising:
- prompting a user to enter one or more of the following in connection with each alert condition: condition triggering alert, one or more designated recipients of the alert, one or more methods of sending the alert for each of the designated recipients, and the content of the alert.

22. The computerized method of claim 16, further comprising:
- generating a report indicating the problem; and
- sending the report to the one or more designated recipients, wherein the report is generated when a sufficient number of occurrences of the problem have been collected.

23. The computerized method of claim 16, wherein the designated recipients include one or more of the following: a regulatory agency, a manufacturer, a payer, and an issuing individual or group.

24. The computerized method of claim 16, further comprising:
- acquiring data regarding the SMD, the data indicating known problems or updates to the SMD; and
- acting upon the known problems or updates.

25. The computerized method of claim 24, wherein acting upon known problems or updates comprise one or more of the following: upgrading the SMD; sending an alert; adjusting alert levels.

26. The computerized method of claim 16, further comprising:
- collecting status information regarding the SMD, the status information including one or more of the following: firmware versions, battery levels, battery quality, connection strength, malfunction reports, and software updates.

27. The computerized method of claim 26, further comprising:
- triggering an alert if a status is outside of acceptable parameters.

28. The computerized method of claim 27, wherein the status being outside the acceptable parameters comprises one or more of the following: a status trend indicating a future problem, or a current status value being outside set parameters.

29. A method comprising:
- detecting, by a processor executing a monitoring system, a new sensor, monitor or device (SMD) that has been added to the monitoring system;
- identifying a virtual monitoring, alerting, controlling and sharing (MACS) device associated with the new SMD;
- retrieving device information associated with the new SMD, wherein the device information is maintained by the virtual MACS device;
- determining, based on the device information, whether there are any serious problems associated with the new SMD, wherein serious problems include problems that would lead to a recall of the new SMD, necessitate a repair of the new SMD, or render the new SMD unreliable;
- when there are serious problems associated with the new SMD, sending a suggestion to a user of the new SMD that the new SMD should not be used; wherein a serious problem is a problem that has a high probability of necessitating a recall or repair of the SMD, or that would make the SMD unreliable; and
- when there are additional problems associated with the new SMD that can be corrected by the update, obtaining the update from an update server via a web syndication feed, deploying the update to the SMD and determining whether the update was successfully installed on the SMD.

30. The method of claim 29, further comprising:
- sending another suggestion to the user that suggests an alternative SMD to use.

31. The method of claim 29, wherein the update upgrades a firmware of the new SMD.

32. The method of claim 29, further comprising:
- notifying the user of any known problems of the new SMD.

33. The apparatus of claim 1, wherein the web syndication feed is a really simple syndication (RSS) feed.

* * * * *